United States Patent [19]

Younes

[11] 4,379,877

[45] Apr. 12, 1983

[54] FIRE RETARDANT THERMOPLASTIC MOLDING COMPOSITIONS

[75] Inventor: Usama E. Younes, West Chester, Pa.

[73] Assignee: Atlantic Richfield Company, Los Angeles, Calif.

[21] Appl. No.: 314,648

[22] Filed: Oct. 26, 1981

[51] Int. Cl.³ .................... C08K 5/52; C08K 5/53; C08L 85/02
[52] U.S. Cl. .................... 524/123; 524/126; 524/127; 524/128; 525/91; 525/187; 525/207; 525/209; 525/232; 525/340; 525/385
[58] Field of Search ............... 524/128, 142, 150, 147, 524/123, 127; 525/91, 187, 188, 340, 385, 207; 528/393, 398

[56] References Cited

U.S. PATENT DOCUMENTS

| | | | |
|---|---|---|---|
| 3,262,918 | 7/1966 | Herweh et al. | 525/340 |
| 3,468,972 | 9/1969 | Hsieh | 525/340 |
| 3,719,730 | 3/1973 | Hansley et al. | 525/340 |
| 3,803,110 | 4/1974 | Richards et al. | 528/393 |
| 3,993,635 | 11/1976 | Mango | 525/340 |
| 4,151,218 | 4/1979 | Lee | 525/187 |
| 4,156,663 | 5/1979 | Okamoto et al. | 525/188 |

*Primary Examiner*—John Kight, III
*Assistant Examiner*—R. A. White
*Attorney, Agent, or Firm*—Dennis M. Kozak

[57] ABSTRACT

A thermoplastic molding composition which comprises a homogeneous mixture of two thermoplastic copolymers is disclosed. In one of its more specific aspects, this invention pertains to a homogeneous mixture of a copolymer of a monovinyl aromatic monomer and an alpha, beta-unsaturated cyclic anhydride and a phosphorus-containing alternating copolymer.

3 Claims, No Drawings

FIRE RETARDANT THERMOPLASTIC MOLDING COMPOSITIONS

This invention relates to thermoplastic molding compositions.

More specifically, this invention pertains to a thermoplastic molding composition which comprises a homogeneous mixture of two thermoplastic copolymers. In one of its more specific aspects, this invention pertains to a homogeneous mixture of a copolymer of a monovinyl aromatic monomer and an alpha, beta-unsaturated cyclic anhydride and a phosphorus-containing alternating copolymer.

It is well known that, regarding the mixing of thermoplastic polymers, incompatibility is the rule and miscibility is the exception. Since most thermoplastic polymers are immiscible in other thermoplastic polymers, the discovery of a homogeneous mixture of two or more thermoplastic polymers is indeed inherently unpredictable with any degree of certainty, for example, see P. J. Flory, *Principles of Polymer Chemistry*, Cornell University Press, 1953, Chapter 13, page 555.

The present invention provides a novel thermoplastic molding composition which comprises a homogeneous mixture of two thermoplastic copolymers. Moreover, in as much as one of the copolymers contains phosphorus units the resulting molded products exhibit excellent fire retardancy.

According to this invention, there is provided a thermoplastic molding composition comprising a homogeneous mixture of a copolymer of a monovinyl aromatic monomer and an alpha, beta-unsaturated cyclic anhydride and an alternating copolymer having the formula:

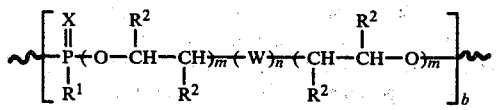

wherein $R_1$ represents a halogen, a ($C_1$ to $C_{10}$) alkyl or halogenated ($C_1$ to $C_{10}$) alkyl group, hydroxy, a ($C_1$ to $C_{10}$) alkoxy or halogenated ($C_1$ to $C_{10}$) alkoxy group, an aryl or halogenated aryl group, and an aryloxy or halogenated aryloxy group; X may or may not be present and represents oxygen or sulfur; W represents at least one monomer selected from the group consisting of dienes, styrenes, vinylidene chloride, vinyl esters, acrylic and methacrylic esters, and acrylonitrile; each $R^2$ separately represents hydrogen, a ($C_1$ to $C_4$) alkyl group, or an aryl group; n represents an integer equal to or greater than 2; each m separately represents an integer from 1 to 20, and b represents an integer from 2 to 1000.

The thermoplastic molding composition of this invention will contain from about 1 to about 99 weight percent of the copolymer of monovinyl aromatic monomer and alpha, beta-unsaturated cyclic anhydride.

The copolymer will contain from about 70 to about 98 weight percent of monovinyl aromatic monomer.

Suitable monovinyl aromatic monomers include styrene, alpha-methyl styrene, nuclear methyl styrenes, ethyl styrene, isopropyl styrene, tert-butyl styrene and the like and mixtures thereof.

The copolymer will contain from about 2 to about 30 weight percent of an alpha, beta-unsaturated cyclic anhydride.

Suitable anhydrides include maleic anhydride, fumaric anhydride, itaconic anhydride, citraconic anhydride, mesaconic anhydride, ethyl maleic anhydride, methyl itaconic anhydride and the like and mixtures thereof.

Optionally, the copolymer can comprise minor amounts of various additives such as, for example, one or more rubbery additives which may be blended with the copolymer as taught in U.S. Pat. Nos. 4,097,550, 4,097,551, 3,641,212 and 2,914,505 or incorporated prior to polymerization as taught in U.S. Pat. No. 3,919,354. The teachings of the above patents are incorporated herein by reference.

The thermoplastic molding composition will contain from about 1 to about 99 weight percent of the phosphorus containing alternating copolymer.

The alternating copolymer can be prepared by first forming a living polymer dianion by anionic polymerization, using an anionic polymerization initiator, of at least one monomer selected from the group consisting of dienes, styrenes, vinylidene chloride, vinyl esters, acrylic and methacrylic esters and acrylonitrile. The resulting living polymer dianion is then reacted with a monoepoxide to produce a living polymer dioxyanion and the living polymer dioxyanion is then reacted with a phosphorus compound having the formula:

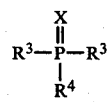

wherein X is as defined above, each $R^3$ separately represents a halogen and $R^4$ represents a halogen, a ($C_1$ to $C_{10}$) alkyl group, a ($C_1$ to $C_{10}$) alkoxy group, an aryl group and an aryloxy group.

Representative of the above phosphorus compounds and particularly suitable for use are: phosphorus (III) chloride, phosphorus (III) bromide, phosphorus (III) ionide, phosphorus (V) tribromide oxide, thiophosphoryl bromide, methyldichlorophosphine, methylphosphonic dichloride, methylphosphorodichloridite, methylphosphorodichloridate, phosphorusoxychloride, methylphosphonothioic dichloride, methylphonic difluoride, ethyldichlorphosphine, ethylphosphonic dichloride, ethylphosphorodichloridite, i-propylphosphonic dichloride, n-propylphosphonic dichloride, n-propylphosphorodichloridite, t-butyldichlorophosphine, n-butylphosphonic dichloride, s-butylphosphonic dichloride, n-butylphosphorodichloridite, n-butylphosphorodichloridate, dibromophenylphosphine, dichlorophenylphosphine, phenylphosphonic dichloride, phenylphosphonothioic dichloride, cyclohexyldichlorophosphine, cyclohexylphosphonic dichloride, ethyldichlorothiophosphate, etc. and the like.

The living polymer dianion can be prepared using any suitable anionic polymerization initiator. Suitable initiators are well known and include the difunctional lithium catalysts designated "DiLi" by Lithium Corporation of America, the dialkali metal reagents (such as, for example, the dipotassium salt) of α-methyl styrene tetramer, and the well-known lithium-napthalene initiator, employed in the examples of this invention.

In the preparation of the alternating copolymers, any monomer (W) or monomer mixture which can be anionically polymerized can be employed. Monomers which can be anionically polymerized are dienes, styrenes, vinylidene chloride, vinyl esters, acrylic and methacrylic esters and acrylonitrile. The term "styrenes" is understood to mean styrene, styrenes which are alkylated in the side chain such as α-methyl styrene and nuclear-substituted styrenes such as, vinyl toluene, t-butylstyrene and ethylvinyl benzene. Styrene monomers are preferred.

Any suitable monoepoxide can be employed. Suitable monoepoxides include propylene oxide, ethylene oxide, styrene oxide, mixtures thereof and the like.

The alternating copolymers may be straight chain, branched or cross-linked depending upon the constituents on the particular phosphorus compound selected and the ratios of reactants employed. For example, if the phosphorus compound contains more than two displaceable halogen groups the amount of branching can be controlled stoichiometrically.

The polymerization reaction is conducted in any suitable inert hydrocarbon or polar solvent such as cyclohexane, tetrahydrofuran, toluene, mixtures thereof, and the like. The polymerization reaction should also be conducted in the absence of oxygen, moisture, carbon dioxide and any other impurity which is detrimental to anionic catalyst systems. The temperature of polymerization may be from about −80° C. to about 120° C., depending upon the freezing point of the solvent employed.

The following examples further demonstrate the invention.

EXAMPLE I

This Example demonstrates the preparation of a phosphorus-containing alternating copolymer used in the practice of this invention.

A one gallon stirred reactor was charged with about 1,500 ml of cyclohexane and about 75 ml of tetrahydrofuran.

The reactor contents were sterilized by the addition of sufficient lithium-napthalene initiator to turn the reactor contents dark green.

About 190 ml of a 1.8 N lithium-napthalene initiator and about 180 ml of styrene monomer were charged into the reactor and the polymerization reaction was allowed to proceed for about 30 minutes at 26° C.

About 75 ml of propylene oxide were added to the reactor contents and the contents stirred for about 30 minutes until the contents turned white indicating the conversion of the polystyryl lithium anions to oxyanions.

About 12 ml of PBr$_3$ were then added to the contents of the reactor and the consideration reaction between the PBr$_3$ and the polystyryl lithium dioxyanions was allowed to proceed for about 40 minutes.

The resulting alternating copolymer was recovered by precipitation from isopropyl alcohol, filtered, washed with methanol and dried under vacuum.

The alternating copolymer was found to have a number average molecular weight range of from about 1,000 to about 716,000 with a maximum peak of about 8,200 as measured by gel permeation chromatography using polystyrene standards. The percent phosphorus content in the copolymer was measured by x-ray fluorescence to be about 2.3.

Using the alternating copolymer produced in Example I and a styrene maleic anhydride copolymer designated Dylark ® 232 resin, commercially available from ARCO Chemical Company, several thermoplastic molding compositions (see TABLE I) were prepared by melt blending various amounts of the copolymers.

After melt blending, each composition was separately compression molded on a compression press manufactured by Pasadena Hydraulic, Inc. to form a ⅛″×¼″×5″ bar.

Each composition was analyzed by dynamic mechanical analysis (DMA) and differential scanning calorimetry (DSC) to determine the homogeneity of the molded composition. The limiting oxygen index (LOI) of each molded bar was also determined using ASTM D-2863.

The compositions and the results of the above analyses are set forth in following Table I:

TABLE I

| Composition (Wt-%) Dylark ® 232 Resin[1]/ Copolymer of Ex. I | DMA E″ Max(20Hz)(°C.) | DSC Tg(°C.) | LOI % O$_2$ |
|---|---|---|---|
| 100/0 | 127 | 122.2 | 18 |
| 95/5 | 127 | 121.4 | 21 |
| 85/15 | 125 | 116.7 | 22 |
| 75/25 | 116 | 111.7 | 24 |
| 60/40 | 110 | 105.0 | 25 |
| 40/60 | 103 | 85.4 | 28 |
| 0/100 | 87 | 72.0 | 33 |

[1]8 weight % maleic anhydride, 92 weight % styrene.

EXAMPLE II

A one gallon stirred first reactor was charged with 500 ml of cyclohexane and 25 ml of tetrahydrofuran and heated to 35° C.

The reactor contents were sterilized by the addition of sufficient lithium-napthalene initiator to turn the reactor contents dark green.

About 40 ml of a 2.8 N lithium-napthalene initiator and about 60 ml of styrene monomer were charged into the first reactor and the polymerization reaction was allowed to proceed for about 30 minutes. Twenty four ml of propylene oxide were added to the reactor contents and the contents stirred for about 30 minutes until the contents turned white indicating the conversion of the polystyryl lithium anions to oxyanions.

About 5.4 ml of potassium tribromide (PBr$_3$) were added to the contents of the reactor and the condensation reaction between the PBr$_3$ and the polystyryl lithium dioxaniona was allowed to proceed for about 15 minutes.

A second one gallon stirred reactor was charged with 1,500 ml of cyclohexane and 70 ml of tetrahydrofuran and heated to about 30° C. The second reactor contents were sterilized by the addition of sufficient lithium napthalene initiator to turn the reactor contents dark green.

About 10 ml of a 2.8 N lithium napthalene initiator and about 200 ml of styrene monomer were charged into the second reactor and the reaction to form a polystyryl lithium dianion was allowed to proceed for about 30 minutes.

The contents of the first reactor and the second reactor were then combined and the resulting copolymer was recovered by precipitation from isopropyl alcohol, filtered, washed with methanol and dried under vacuum.

The copolymer was found to have a number average molecular weight of about 26,000.

The resulting copolymer was melt blended with an equal weight of Dylark 232 resin.

The resulting thermoplastic molding composition was compression molded on a Pasadena hydraulic press into a ⅛"×¼"×5" bar.

The composition was analyzed by DMA and found to be a homogeneous mixture as indicated by one glass transition at 121° C.

The above data demonstrate that the compositions of this invention which comprise a copolymer of a monovinyl aromatic monomer and alpha, beta-unsaturated cyclic anhydride copolymer as described above are homogeneous mixtures as evidenced by a single glass transition. Moreover, the above data further shows that the thermoplastic molding compositions of this invention exhibit excellent fire retardancy as indicated by LOI.

It will be evident from the foregoing that various modifications can be made to this invention. Such, however, are considered to be within the scope of this invention.

What is claimed is:

1. A thermoplastic molding composition comprising a homogeneous mixture of a copolymer of a monovinyl aromatic monomer and an alpha, beta-unsaturated cyclic anhydride and an alternating copolymer having the formula:

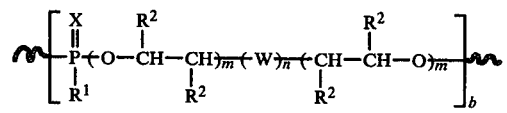

wherein $R^1$ represents a halogen, a ($C_1$ to $C_{10}$) alkyl or halogenated ($C_1$ to $C_{10}$) alkyl group, hydroxy, a ($C_1$ to $C_{10}$) alkoxy or halogenated ($C_1$ to $C_{10}$) alkoxy group, an aryl or halogenated aryl group, and an aryloxy or halogenated aryloxy group; X may or may not be present and represents oxygen or sulfur; W represents at least one monomer selected from the group consisting of dienes, styrenes, vinylidene chloride, vinyl esters, acrylic and methacrylic esters, and acrylonitrile; each $R^2$ separately represents hydrogen, a ($C_1$ to $C_4$) alkyl group, or an aryl group; n represents an integer equal to or greater than 2; each m separately represents an integer from 1 to 20, and b represents an integer from 2 to 1000.

2. The thermoplastic molding composition of claim 1 in which said copolymer of a monovinyl aromatic monomer and an alpha, beta-unsaturated cyclic anhydride is styrene-maleic anhydride.

3. The thermoplastic molding composition of claim 1 in which said copolymer or a monovinyl aromatic monomer and an alpha, beta-unsaturated cyclic anhydride is rubber modified by the incorporation of a rubbery additive.

* * * * *